US006608548B1

(12) United States Patent
Pellaton et al.

(10) Patent No.: US 6,608,548 B1
(45) Date of Patent: Aug. 19, 2003

(54) CONTROL DEVICE WITH REDUNDANCY FOR FITTING TO A LOCK

(75) Inventors: Pierre Pellaton, Le Locle (CH); Didier Dominé, La Chaux-de-Fonds (CH)

(73) Assignee: Ilco-Unican S.A./Rehlor Division (CH)

( * ) Notice: Subject to any disclaimer, the term of this patent is extended or adjusted under 35 U.S.C. 154(b) by 0 days.

(21) Appl. No.: 09/424,217

(22) PCT Filed: May 22, 1998

(86) PCT No.: PCT/CH98/00214

§ 371 (c)(1),
(2), (4) Date: Nov. 19, 1999

(87) PCT Pub. No.: WO98/54428

PCT Pub. Date: Dec. 3, 1998

(30) Foreign Application Priority Data

May 30, 1997 (EP) .......................................... 97108687

(51) Int. Cl.[7] .............................................. G05B 19/00

(52) U.S. Cl. ...................... 340/5.54; 340/5.51; 340/5.1; 340/5.2; 361/171; 70/278.1

(58) Field of Search .............................. 340/5.54, 5.51, 340/5.1, 5.2; 361/171, 191; 70/277, 278.1

(56) References Cited

U.S. PATENT DOCUMENTS 5,136,704 A 8/1992 Danielsen et al. .......... 395/575
5,307,655 A 5/1994 Boltz et al.
5,410,444 A * 4/1995 Juds .......................... 361/191
6,359,547 B1 * 3/2002 Denison et al. ............ 340/5.73

FOREIGN PATENT DOCUMENTS

BE 874 278 A 6/1979
FR 2 661 938 11/1991

* cited by examiner

*Primary Examiner*—Julie Lieu
(74) *Attorney, Agent, or Firm*—Griffin & Szipl, P.C.

(57) ABSTRACT

The present invention relates to a control device (20) with redundancy for fitting to a lock having a mechanism (21) for locking an unlocking an access door, the device (20) being adapted to manage a change of state of this lock under predetermined conditions and to ensure that this state current is kept current up until the next change of state. This device (20) comprises means (30) for controlling the mechanism (21) and two units (31; 32) for providing like instructions to the control means. This device (20) is characterized in that the first unit (31) has a structure different from that of the second unit (32), while effecting common functions, and in that the control means behave functionally as an AND gate to the inputs of which are applied the instructions from the units respectively, when the device is functioning in a normal situation.

17 Claims, 6 Drawing Sheets

CONTROL DEVICE WITH REDUNDANCY FOR FITTING TO A LOCK

FIELD OF THE INVENTION

The present invention relates to the field of locks and more particularly to a control device with redundancy for fitting to a lock of an access door to a protected place, the device being adapted to manage a change of state of the lock and to maintain this state current.

BACKGROUND OF THE INVENTION

In general terms there are three types of locks for fitting to an access door of a place protected by an enclosure, such as a strong box and a strongroom: time locks, combination locks and delayed action locks. There are furthermore locks arranged to implement the functions of time locks, combination locks and delayed action locks.

By way of example, FIG. 1 shows a conventional electromagnetic lock comprising a mechanism 1 for locking and unlocking an access door of the type mentioned above, by way of a bolt 3 of this lock. The mechanism 1 is controlled by an electronic control device 2 and is connected mechanically to the bolt 3. The mechanism 1 is designed to block the bolt 3 in a certain position (typically in the locking position) for a predetermined duration defined by the control device 2. The control device 2 comprises release means 4 for instructing a change of state of the lock and control means 5 for effecting this change of state. To this end, the release means 4 are electrically connected to the control means 5, which are mechanically connected to the mechanism 1 in such a way that the release means 4 can provide a request for a change of state of the lock to the control means 5 and that the control means 5 can command the mechanism 1 to make this change, i.e. the locking or unlocking of the access door. The control device 2 further comprises a clock mechanism formed essentially by an internal clock 6 for defining the elapse of real time and by a memory 7 for storing information provided by an external user by way of a user interface 8. Furthermore the user interface 8 comprises display means (not shown in FIG. 1) for providing the external user with information relating to the operation of the control device 2.

A fair number of electronic control devices have been proposed to ensure optimum security of places to be protected. The control devices used most often rely on the principle of redundancy applied to the electronic components which they employ, so that, in the case of failure of one of the electronic components, the other electronic component can ensure unlocking and locking of the access door, in order to avoid destructive external intervention on the door or its lock, and to maintain the protection of the assets.

The patent BE 874 278 describes a combination control device for opening an access door of the type referred to. FIG. 2 of the present description shows such a device which will be denoted by the reference 10.

The device 10 comprises a keyboard 11 allowing combinations to be entered and two identical assemblies 12 and 12'. The assembly 12 comprises a first memory 13 containing the combination which allows the lock to be released, a second memory 14 arranged to receive the combination entered by way of the keyboard 11 by the person desiring to release the lock, first means 15 arranged to compare the combination contained in the first memory 13 with the combination entered in the second memory 14, and second means 16 arranged to cause the lock to be released when it receives an appropriate signal from the first means 15. The elements of the electronic assembly 12' are identical to the corresponding elements of the assembly 12 and carry the same references as the latter, supplemented with a prime.

The principle of redundancy has also been applied to mechanical components, for example in time locks. By way of example, French patent application published under the No. 2 661 938 in the name of CIPOSA MICROTECHNIQUES describes a lock fitted with a control device comprising two similar mechanical time movements. Typically the same duration of locking the access door is given to these two movements in the evening, so that at least one of the movements controls the unlocking of the access door the following morning.

However, the applicant of the present invention has appreciated that such duplication of equipment does not provide a satisfactory solution to guaranteeing the unlocking and locking of the access door under predetermined conditions.

Thus, consider the case in which the lock of a strong box fitted with the device 10 of FIG. 2 is subject to a disturbance, which may be a change in temperature or humidity for example, resulting from an adjacent industrial activity or an atmospheric effect. Such a disturbance then has the same effect on the assembly 12' as on the assembly 12. In other words, simple duplication of the components of the device 10 does not enable a very high reliability of the device to be achieved.

Consider now the case in which the assemblies 12 and 12' are formed by electronic components which come from the same batch of faulty components. Thus these two components provide identical signals but these are not necessarily representative of a behaviour initially desired by the programmer. Once again, simple duplication of the components of the device does not enable a very high reliability of the device to be achieved.

Consider finally the case in which duplicated assemblies such as the assemblies 12 and 12' comprise processing units programmed according to the same program. Thus the two units have identical behaviour, in particular in the case in which the said program includes programming errors. Once again the simple duplication of the components of the device 10 does not enable a very high reliability of the device to be achieved.

One object of the present invention is to provide a control device with redundancy for fitting to a lock, which device alleviates the problems mentioned above.

Another object of the present invention is to provide such a control device which can be adapted to different types of lock.

Another object of the present invention is to provide such a control device which has optimum immunity to disturbances.

Another object of the present invention is to provide such a control device meeting the needs of expense, simplicity and size.

SUMMARY OF THE INVENTION

These objects as well as others are met by the control device with redundancy according to claim 1.

One advantage of the two units lies in that these two units have two different structures and two different modes of functioning and that each electronic unit can detect faulty function of the other unit and initiate, under certain conditions, a procedure for reestablishing functioning in a normal situation of the disturbed control device, which gives the control device an optimum immunity to the disturbances.

Thanks to other characteristics of the control device with redundancy according to the present invention, one advantage of the two electronic units is that they can be programmed in accordance with two different programs respectively, which prevents the occurrence of an undesired unlocking or locking, in contrast to the conventional devices referred to above, in which the two units are provided with the same program, yielding the same command under the same conditions of execution of this program.

Thanks to other characteristics of the control device with redundancy according to the present invention, an advantage of the intermediate unit of this control device is acting as an intermediary during a transfer of data between the said electronic units, each electronic unit being able to access the intermediate unit selectively, which ensures excellent immunity from disturbances for this control device.

Thanks to other characteristics of the control device with redundancy according to the present invention, an advantage of the static supervisory signals of this control device is to provide for precision checking of the level of each static signal, which allows the activity to be checked at the time and thus gives this control device a high level of immunity to noise compared operation on the basis of dynamic signals.

Thanks to other characteristics of the control device with redundancy according to the present invention, an advantage of the control system with redundancy of this control device is avoidance of needless triggering of the emergency system, when the control system is capable of reestablishing itself in the normal functional situation of the control device.

BRIEF DESCRIPTION OF THE DRAWINGS

The objects, characteristics and advantages, as well as others, of the present invention will appear more clearly from a reading of the detailed description of a preferred embodiment of the invention, given solely by way of example, with reference to the accompanying drawings, in which.

DETAILED DESCRIPTION OF THE INVENTION

Figure 3:
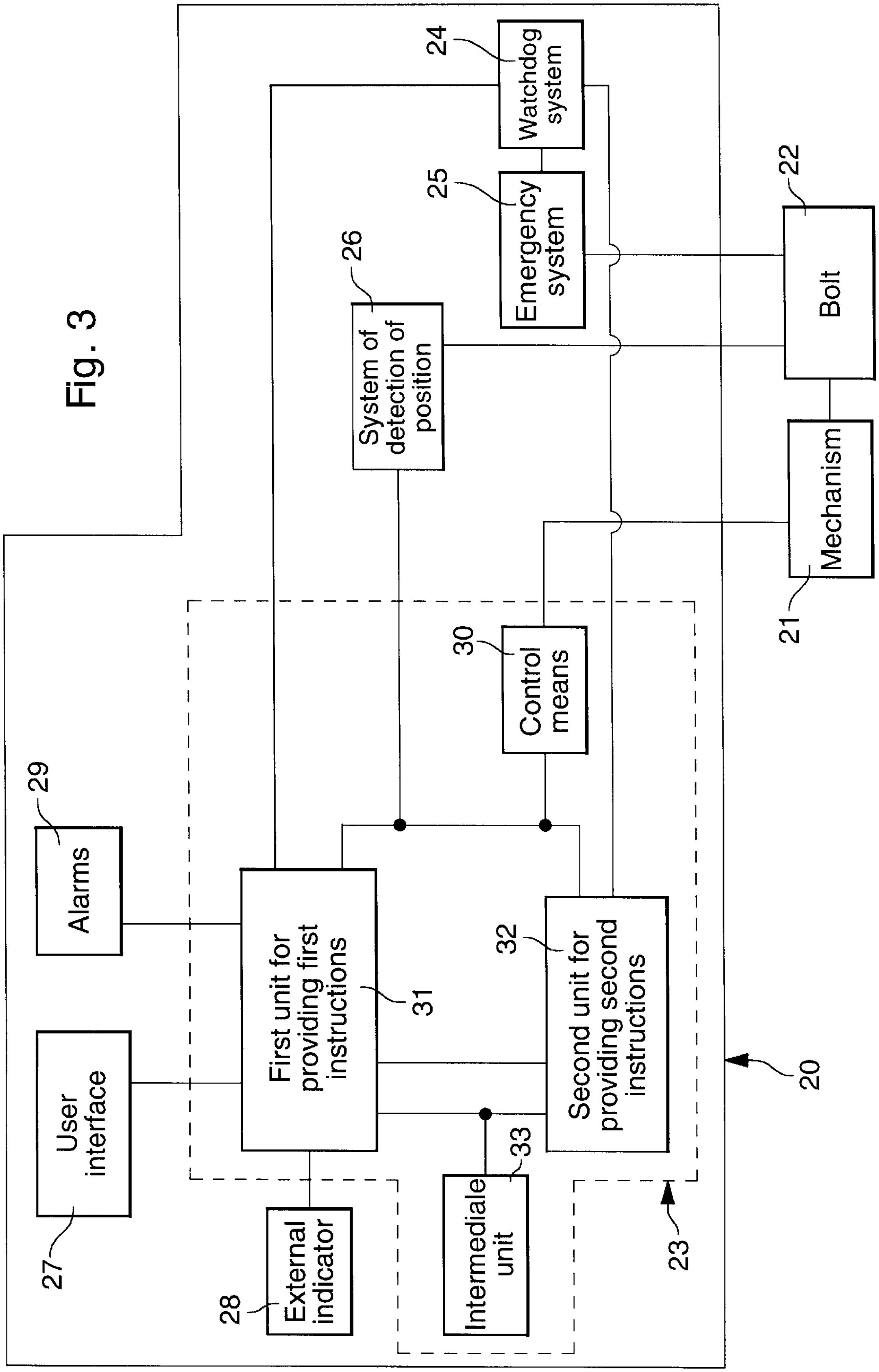
FIG. 3 shows a block diagram of a preferred embodiment of a control device with redundancy according to the present invention.

FIG. 3 shows a block diagram of a preferred embodiment of a control device 20 with redundancy according to the present invention. The control device 20 is intended to be fitted to a lock of an access door to a protected place, this lock comprising a mechanism 21 for locking and unlocking the access door. The mechanism 21 is mechanically connected to a bolt 22 of the said lock, through a motor (not shown) adapted to change the position of the bolt 22, to effect locking or unlocking of the access door. The control device 20 comprises a control system 23 with redundancy for controlling the mechanism 21. The control device 20 also comprises a watchdog system 24 adapted to trigger an emergency system 25 which can control unlocking of the access door, when no activity is detected in the control system 23.

The control device 20 can also advantageously comprise a system 26 for detecting a change in the position of the bolt, a user interface 27, an external indicator 28 and alarms 29.

As shown in FIG. 3, the bolt 22 comprises first and second connecting means mechanically connected to the mechanism 21 and to the emergency system 25 respectively, as will be described in detail. Thus the bolt 22 can be operated by the mechanism 21 or by the emergency system 25. The bolt 22 also comprises third connecting means connected mechanically to the system 26 for detecting a change in the position of the bolt, as will also be described in detail. The bolt is preferably implemented conventionally, as is known to the man skilled in the art.

The system 26 for detecting a change in the position of the bolt comprises first and second connecting means. These first connecting means are mechanically connected to the third connecting means of the bolt 22. The second connecting means of the system 26 of change in the position of the bolt are connected electrically to the control system 23, as will be described in more detail. The system 26 for detecting a change in the position of the bolt comprises means for providing signals so arranged that they provided signals to the control system 23 when a change in the position of the bolt 22 has taken place. To this end, the system 26 for detecting a change in the position of the bolt is preferably formed by a mechanical circuit breaker known per se.

The mechanism 21 comprises first, second and third connecting means. These first connecting means are mechanically connected to the first connecting means of the bolt 22. The second and third connecting means of the mechanism 21 are electrically connected to the control system 23, as will be described in more detail. The mechanism 21 is preferably implemented conventionally, as is known to the man skilled in the art.

The control system 23 comprises control means 30 adapted to control the mechanism 21, first and second units denoted 31 and 32 respectively, to provide first and second instructions respectively to the control means 30, and an intermediate unit 33 electrically connected to the units 31 and 32.

The control means 30 comprise first and second connecting means. These first connecting means are electrically connected to the second connecting means of the mechanism 21, so that the control means 30 can control the mechanism 21 to operate the bolt 22 under certain conditions, as is also described below. The second connecting means of the control means 30 are electrically connected to the units 31 and 32, as will be described in more detail. The control means 30 are preferably formed by a component marketed by National under the designation 74251.

As is essential, the unit 31 has a first structure and a first mode of functioning and the unit 32 has a second structure and a second mode of functioning. These two units are so arranged that the first and second structures are substantially different and that the first and second modes of functioning are also substantially different, while effecting common functions. These common functions are typically ensuring maintenance of the timekeeping, locking and unlocking of the access door according to predetermined time conditions, checking the presence of activity of the other unit, and/or checking the validity of access codes.

Thus each unit 31, 32 comprises a quartz resonator and means for ensuring the maintenance of timekeeping. Each unit 31, 32 also comprises means for providing check signals to be provided to the other unit 32, 31, representing the current activity of the said unit 31, 32, this unit 31, 32 being adapted to implement a plurality of activities.

Each unit 31, 32 also comprises first, second, third and fourth connecting means, as will be described in more detail. What is essential is that the first connecting means of the units 31 and 32 are electrically connected to each other, as well as to the second connecting means of the control means 30 and to the third connecting means of the mechanism 21. The second connecting means of the units 31 and 32 are electrically connected to each other and the third connecting means of the units 31 and 32 are also connected to each other, as well as to the intermediate unit 33, as will be described in more detail. The fourth connecting means of the units 31 and 32 are electrically connected to the watchdog system 24, as will also be described in more detail.

The unit 31 also comprises measuring means for measuring the electric power supply levels, means for providing alarm control signals in order to provide alarm control signals when a disturbance or anomalous situation is detected, and control means for controlling a display on display means, for example the external indicator 28. To this end, the unit 31 comprises fifth, sixth and seventh connecting means, as will be described in more detail.

The unit 31 thus has a more complex architecture that the unit 32. The unit 31 is preferably formed by a component marketed by Hitachi under the designation H8/3834 and the unit 32 is formed by a component marketed by NEC under the designation μPD75P0016.

By virtue of its more complex structure, the unit 31 performs more complex functions than the unit 32. Thus the unit 31 manages the user interface 27 and the communication port with peripheral systems, such as the external indicator 28 and the alarms 29.

The intermediate unit 33 comprises connecting means connected electrically to the third connecting means of the units 31 and 32. The intermediate unit 33 is formed by memory means with dual access, in which each unit 31, 32 can store data to be provided subsequently to the other unit 32, 31. These memory means are preferably formed by a non-volatile memory and, again for preference, by an EEPROM memory.

The EEPROM memory has a shared zone for storing data emanating from one of the units 31 and 32 and intended to be provided subsequently to the other unit. The EEPROM memory is so arranged that the two units 31 and 32 can access the shared zone in alternate manner, so as to protect the coherence of the data exchanged with the EEPROM memory, especially in the case in which one of the units 31 and 32 is suffering from a disturbance or an anomalous situation. In other words, the EEPROM memory functions as an intermediary during a transfer of data between the units 31 and 32. Furthermore, the EEPROM memory takes care of keeping the log of events relating to the transactions effected on the lock, the changes of state of the lock, the detection of disturbances and anomalous situations.

The EEPROM memory further comprises a reserved protected zone to which write access is restricted to the unit 31. This reserved protected zone is for storing parameters programmed by the user and operating variables. By way of example, the programmed parameters comprise the access codes, variables of the identity of the lock, the time data relative to unlocking and/or locking of the access door, and the operating variables comprise the nominal voltage thresholds, the absolute error value of the frequency of oscillation of the quartz crystal, and parameters relating to the quality standards.

The EEPROM memory is preferably formed by a component marketed by XICOR under the designation X24325S.

The watchdog system 24 comprises first, second and third connecting means. These first and second connecting means are electrically connected to the fourth connecting means of the units 31 and 32 respectively. The third connecting means of the watchdog system 24 are electrically connected to the emergency system 25, as will be described in more detail. The watchdog system 24 is described in European patent 0 256 430. As to essentials, the watchdog system 24 is formed by detecting means for detecting the presence of activity of the units 31 and 32 and trigger means for triggering the emergency system 25 when the two units 31 and 32 no longer function for a period greater than a predetermined duration of typically 5 s.

The emergency system 25 comprises first and second connecting means. These first and second connecting means are electrically connected to the third connecting means of the watchdog system 24 and mechanically to the second connecting means of the bolt 22. The emergency system 25 further comprises a supplementary motor and control means so arranged that they can control the motor to effect a change in the position of the bolt 22 when no presence of activity is detected in the control system 23 by the watchdog system 24.

The user interface 27 comprises connecting means connected electrically to the fifth connecting means of the unit 31. The user interface 27 typically comprises a liquid crystal display and a keyboard.

The external indicator 28 comprises connecting means connected electrically to the sixth connecting means of the unit 31. The external indicator 28 typically comprises display means, a computer and a keyboard. These various components are located outside the protected place and are so arranged that a user present outside this place can provide the access codes to the unit 31, determine the state of the lock and lock the access door by way of the external indicator 28. It is obvious that these various functions are given only by way of illustration.

The alarms 29 comprise connecting means connected electrically to the seventh connecting means of the unit 31. The alarms 29 further comprise means for providing alarm signals, these means being so arranged that they provide alarm signals when they receive alarm control signals from the unit 31. In this embodiment, the alarms 29 are formed by first and second bistable relays known per se, to which are connected a telephone transmitter and a sound emitter respectively, for example.

Furthermore electric resistances (not shown) can advantageously be provided as protection means, these resistances being connected in series with the second connecting means of the unit 31.

Obviously all the components described above with reference to FIG. 3 are connected to electric power supplies (not shown) known per se to the man skilled in the art.

Figure 4:
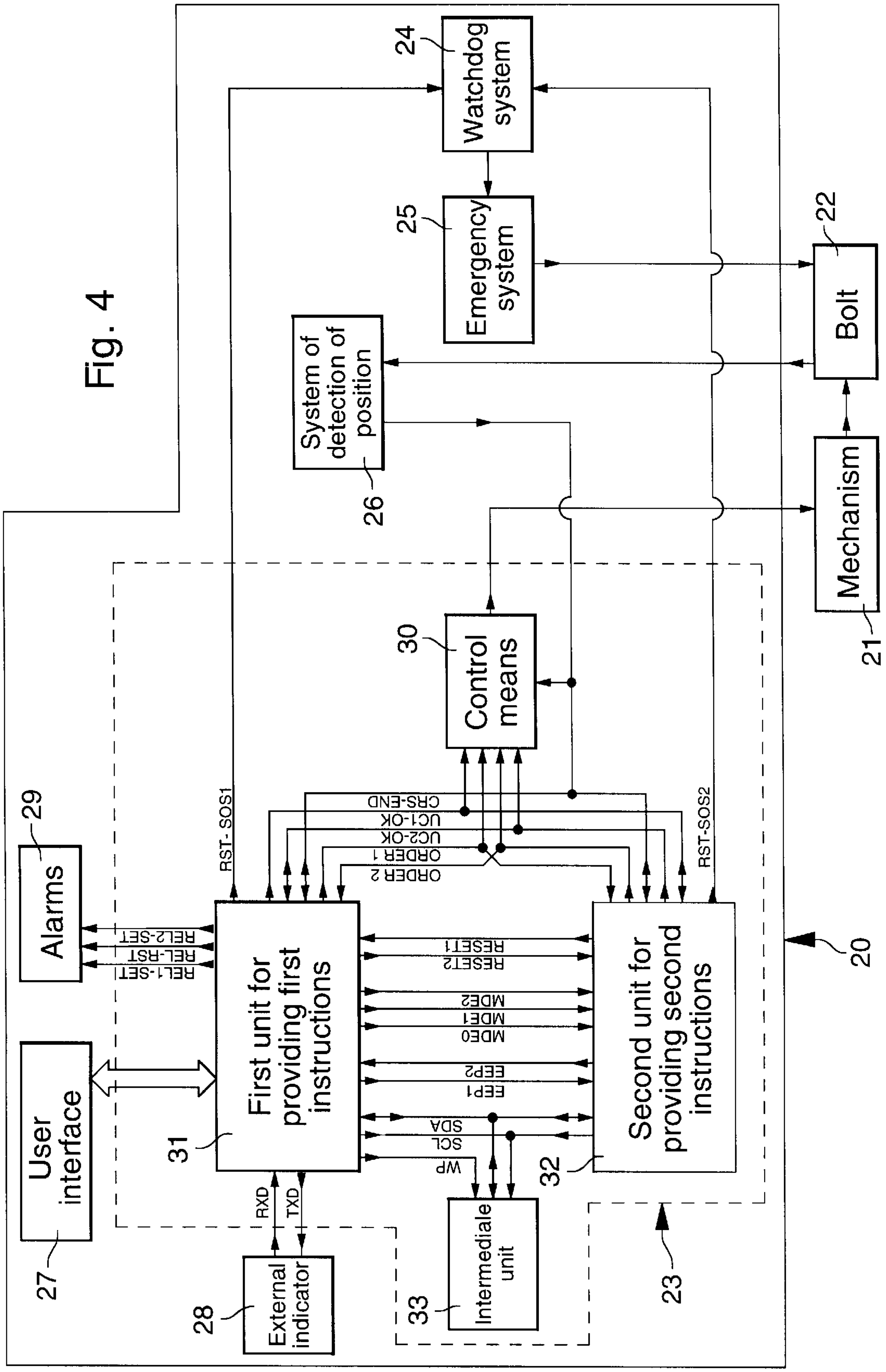
FIG. 4 shows the control device of FIG. 3 in detail.

FIG. 4 shows in more detail the connecting means which connect the various components described above with reference to FIG. 3.

Figure 1:
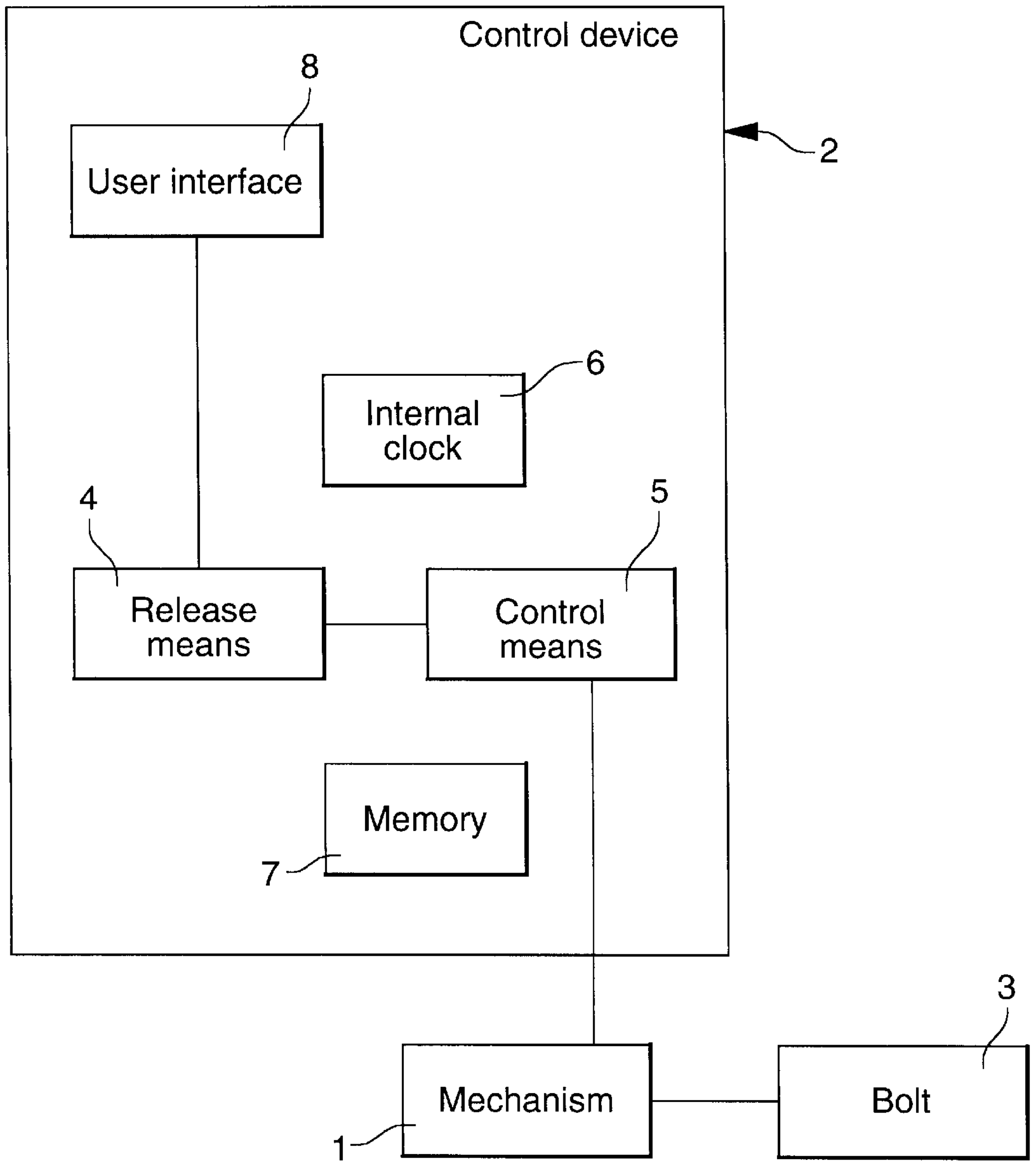
Fig. 1 (PRIOR ART)
FIG. 1 already referred to shows a lock fitted with an electronic control device according to the prior art.
Figure 2:
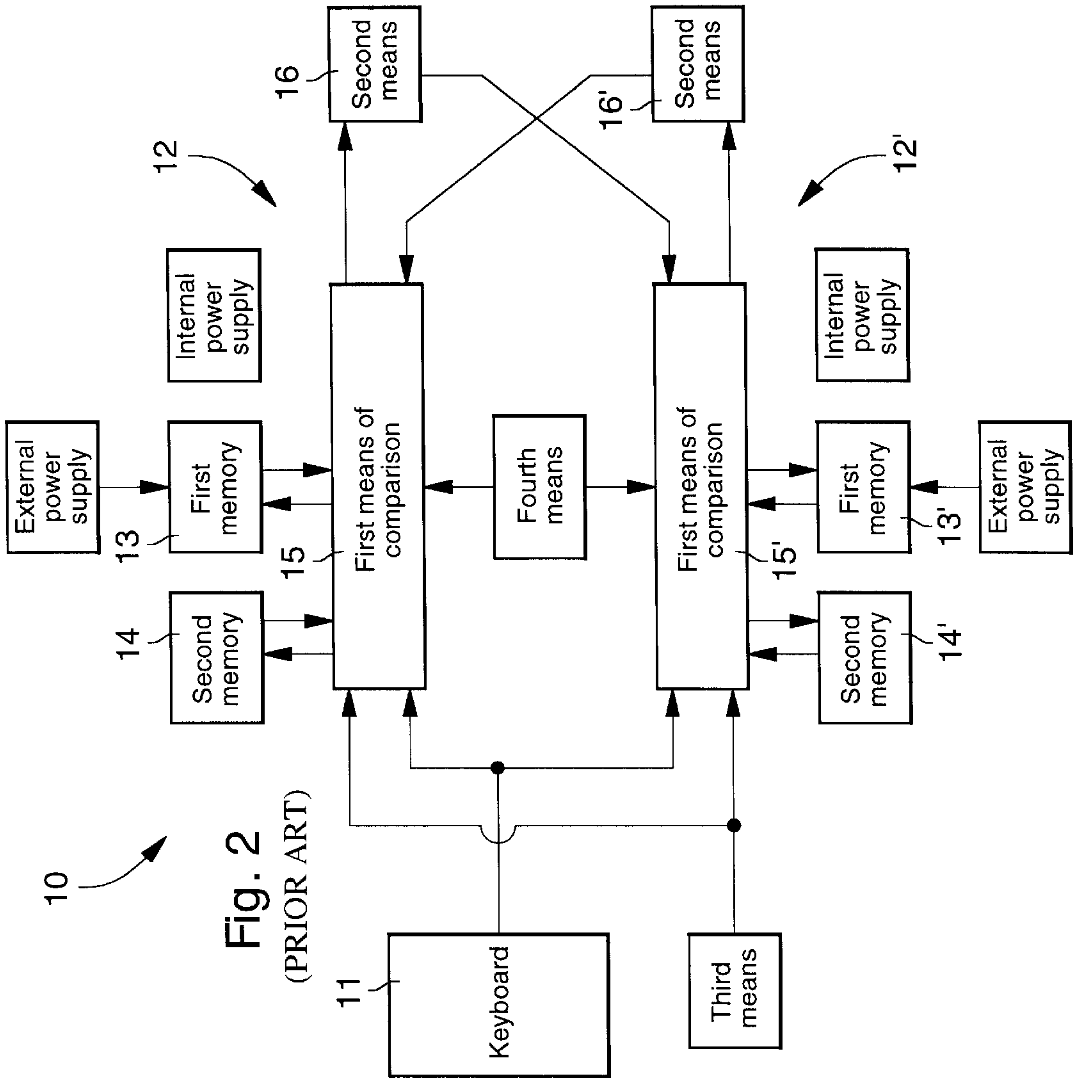
Fig. 2 (PRIOR ART)
FIG. 2 already referred to represents a control device with redundancy according to the prior art.

FIG. 4 shows the same components as those described with reference to FIG. 3 and these components are denoted by the same reference numerals as in FIGS. 2 and 3.

All the signals present in the control device 20 are processed by the unit 31, since this unit manages the said more complex functions, as well as the said functions common to the two units 31 and 32, as has been mentioned above.

The practical implementation of the connecting means between the various components will not be described, this implementation being assumed to be known per se to the man skilled in the art and shown in FIG. 4 solely by way of example.

As to the essentials, each connecting means of the unit 31 provides and/or receives specific signals, as is described in more detail below.

The first connecting means of the unit 31 provide signals denoted UC1_OK, UC2_OK, ORDER1 and CRS_END and receive the signals UC2_OK and CRS_END and a signal denoted ORDER2.

If the signal UC1_OK is at the high level, it indicates that the unit 31 is operational and the unit 32 is then informed that the unit 31 is confirming its state of proper functionality. If the signal UC1_OK is at the low level it indicates that the unit 31 is carrying out re-initialisation. Moreover the unit 32 can decree that the unit 31 is no longer operational and impose the low state on the signal UC1_OK. The control means 30 then no longer take account of the instruction provided by the unit 31.

The signal ORDER1 is provided as an instruction by the unit 31 and allows the unit 32 to check the validity of the instruction provided by the unit 31. The unit 32 can determine if the signal ORDER1 is correct when the access door is locked or when the lock functions as a time lock.

If the unit 31 sets the signal CRS_END to the low level, the motor for changing the position of the bolt 22 can start up in the sense defined by the control means 30. When the cam of this motor leaves its end of run position, this cam keeps the signal CRS_END at low level, which allows this cam to run its course. When the cam reaches the end of run position, the signal CRS_END is set to high level and the motor is stopped again. Thus, if the unit 31 wishes to apply the signals ORDER1 and ORDER 2, it sets the signal CRS_END at low level for 100 ms. The signal CRS_END also allows the detector unit 31 to detect if the cam has effected its movement. The unit 31 can thus detect a problem with the motor, if the signal CRS_END initially at the high level is held at the low level for a predetermined duration, typically less than 200 ms or greater than 5 s.

If the signal UC2_OK is at the high level, it indicates that the unit 32 is operational. If the unit 32 is re-initialised, it sets the signal UC2_OK at the low level and this signal then reverts to the high level when this re-initialisation procedure has finished. The unit 31 can impose a low level on the signal UC2_OK and, in this case, the control means 30 do not take account of the signal ORDER2.

The signal ORDER2 is provided as an instruction by the unit 32. This signal is redefined every half second and corresponds to a "request to unlock" when the signal is at the high level and to a "request to lock" when this signal is at the low level.

The second connecting means of the unit 31 provide signals denoted EEP1, MDE0, MDE1, MDE2 and RESET2 and receive signals denoted EEP2 and RESET1.

The signal EEP1 provided by the unit 31 is used to indicate to the unit 32 that the unit 32 can access the EEPROM memory without risk of conflict with the unit 31. In other words, the signal EEP1 is used to indicate to the unit 32 the period during which access to the EEPROM memory is reserved to the unit 31. Every second, the unit 31 sets the signal EEP1 to the high level or the low level. Thus the signal EEP1 at the high level indicates that access is reserved to the unit 31 and thus that the unit 32 cannot have access to the EEPROM memory.

Likewise, the signal EEP2 provided by the unit 32 is used to indicate to the unit 31 that the unit 31 can access the EEPROM memory without risk of conflict with the unit 32.

The signals MDE0, MDE1 and MDE2 provided by the unit 31 to the unit 32 represent the current activity of the unit 31. Table 1 shows eight different activities of the unit 31, as well as the predetermined values of the signals MDE0, MDE1 and MDE2 associated with these activities.

TABLE 1

| Activity | MDE2 | MDE1 | MDE0 |
|---|---|---|---|
| A | 0 | 0 | 0 |
| B | 0 | 0 | 1 |
| C | 0 | 1 | 0 |
| D | 0 | 1 | 1 |
| E | 1 | 0 | 0 |
| F | 1 | 0 | 1 |
| G | 1 | 1 | 0 |
| H | 1 | 1 | 1 |

The activity A corresponds to a current fault of a component of the control device 20, for example a lack of coherence in the contents of the EEPROM memory. The activity B corresponds to making a new event available in the EEPROM memory. The activity C corresponds to current occupation with the user access. The activity D corresponds to synchronisation of the unit 32 by the unit 31. The activity E corresponds to locking commanded remotely from the said access door. The activity F corresponds to activation of the emergency system 25. The activity G corresponds to checking the reliability given by the components of the lock. The activity H corresponds to operation in the normal situation of the unit 31 and is provided by default to the unit 32, such functioning being defined below in more detail. Thus the signals MDE0, MDE1 and MDE2 pass through the state "111" when the unit 31 passes from one state to the other. Such changes can take place at the passage of the next second.

The signal RESET1 allows the unit 32 to re-initialise the unit 31, when the unit 32 sets this signal to the low level for at least 40 $\mu$s. This procedure takes place when the unit 32 detects that the unit 31 is not functioning in the normal situation. In the case of prolonged malfunction, the unit 32 keeps the signal RESET1 at the low level and the unit 31 is thus disconnected.

Likewise the signal RESET2 is used by the unit 31 to re-initialise or disconnect the unit 32.

The man skilled in the art will note that the control signals of the control device 20 are static during the functioning of this control device 20. In other words, the signals EEP1, EEP2, MDE0, MDE1, MDE2, RESET1 and RESET2 are equal to low and high levels. Such operation advantageously allows the level of each signal to be checked with precision, which allow the current activity to be checked with precision. Thus this functioning ensures that the control device 20 has high immunity from noise, in contrast to operation based on dynamic signals.

The third connecting means of the unit 31 provide signals denoted WP, SCL and SDA to the EEPROM memory and receive the signal SDA from the EEPROM memory.

The signal WP allows the unit 31 to have write access to the said reserved protected zone of the EEPROM memory.

The signal SCL is the clock signal which allows the transfers of data from and to the EEPROM memory to be synchronised.

The signal SDA provides serial data between the EEPROM memory and the unit 31, 32.

The fourth connecting means of the unit 31 provide a signal denoted RST_SOS1.

The signal RST_SOS1 allows the watchdog system 24 to be re-initialised. When the unit 31 is functioning in the normal situation, the unit 31 re-initialises the watchdog system 24 by inverting the level of this signal every second. When the unit 31 is no longer active or if it wants to activate the emergency system 25, the unit 31 no longer re-initialises the watchdog system 24.

Likewise, the fourth connecting means of the unit 32 provide a signal denoted RST_SOS2 which allows the unit 32 to re-initialise the watchdog system 24 and to activate the emergency system 25.

The sixth connecting means of the unit 31 provide a signal denoted TXD and receive a signal denoted RXD.

The signal TXD provides data from the unit 31 in asynchronous manner to the external indicator 28, as is known to the man skilled in the art.

The signal RXD provides data from the external indicator 28 in asynchronous manner to the unit 31, as is also known to the man skilled in the art.

The seventh connecting means of the unit 31 provide signals denoted REL1_SET, REL2_SET and REL_RST, these signals being used as alarm control signals.

The signal REL_SET activates the first bistable relay of the alarms 29.

The signal REL2_SET activates the second bistable relay of the alarms 29.

The signal REL_RST de-activates the first and second bistable relays of the alarms 29.

The operation of the control device 20 with redundancy according to the present invention will be described below. As explained in detail above with reference to FIGS. 2 and 3, the control system 23 with redundancy of the control device 20 comprises two units 31 and 32 which effect common functions relative to management of a change of state of the lock under predetermined conditions and to ensuring that the current state is maintained until the next change of state. In consequence only the operation of the unit 31 will be described, this unit being thus selected arbitrarily.

A normal situation is defined as a situation in which the two units 31 and 32 provide the same instruction to the control means 30. An anomalous situation is equally defined as a situation during which an internal or external effect on the control device 20 modifies the functioning of this device compared with its functioning in the normal situation. Such an effect is generally caused by a disturbance whose nature may be voluntary, for example a change in the position of the bolt 22 or picking the lock, or involuntary, for example a fault in a component, an adjacent industrial activity or an atmospheric activity such as a sunburst or electromagnetic discharges of high intensity.

In contrast to a normal situation, an exception situation is defined as a situation produced following detection of a disturbance or an anomalous situation resulting in: provision of two different instructions by the two units 31 and 32, for example one requesting the mechanism 21 to unlock the access door and the other requesting it to be locked; or the absence of activity in at least one of the units 31 and 32. The control device 20 then initiates a specific procedure to re-establish operation corresponding to operation in the normal situation prior to the said detection.

Thus there are essentially two modes of operation of the control device 20: operation in the normal situation and operation in an exception situation.

Figure 5:
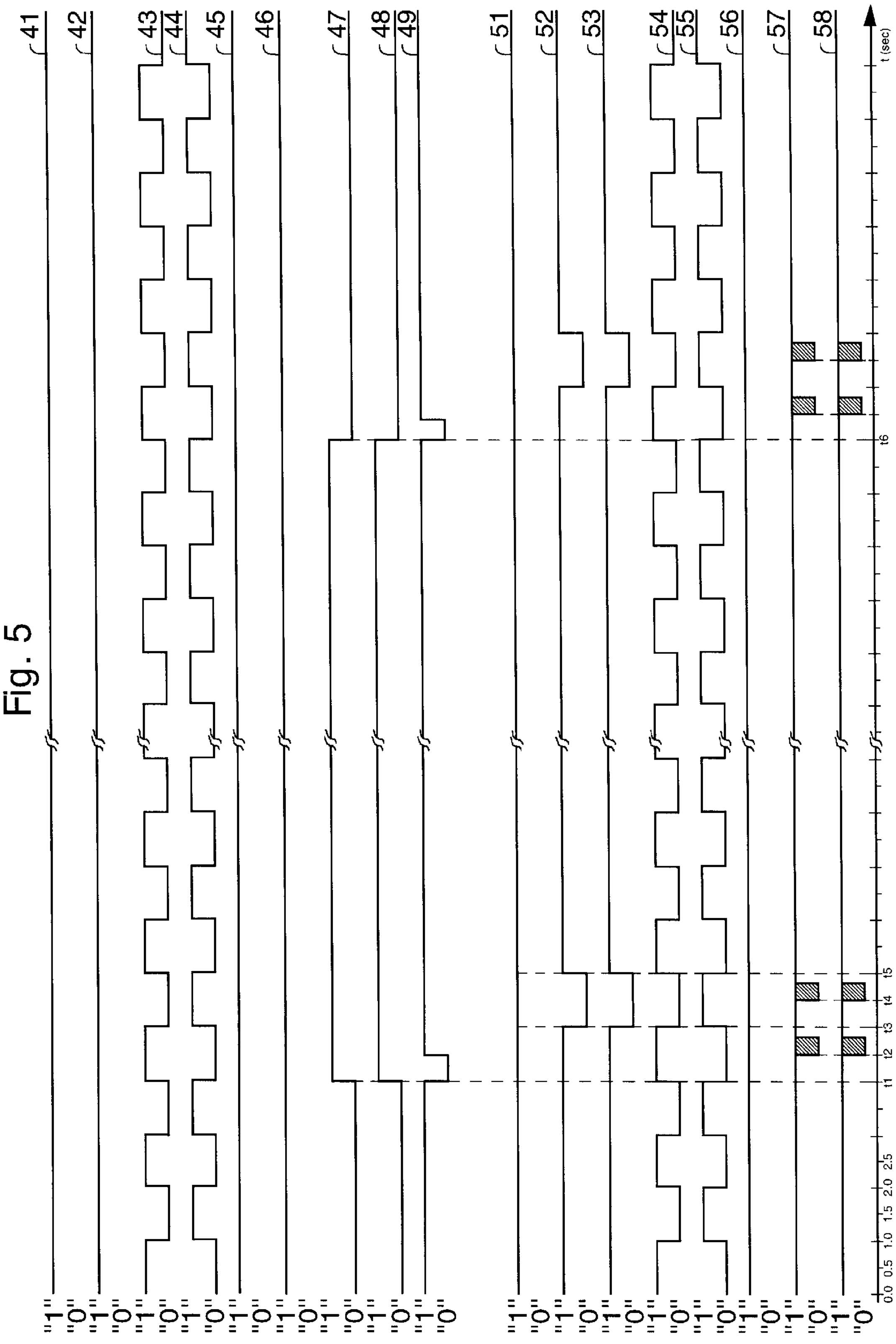
FIG. 5 shows waveforms of operation of the control device with redundancy according to the present invention, in the case of a normal situation.

Solely by way of example, FIG. 5 shows waveforms of operation of the control device 20 with redundancy according to the present invention in the case of a normal situation in which the control device 20 is to unlock the access door and then lock it again.

Referring to the signals described with reference to FIG. 4, the references 41 to 49 and 51 to 58 of FIG. 5 denote the waveforms of the signals RESET1, RESET2, RST_SOS1, RST_SOS2, UC1_OK, UC2_OK, ORDER1, ORDER2, CRS_END, MDE0, MDE1, MDE2, EEP1, EEP2, WP, SDA, SCL respectively, these signals being capable of being set to a low level denoted “0” or a high level denoted “1”.

During operation in the normal situation, the two units 31 and 32 are operational and are thus not re-initialised. In consequence the signal UC1_OK (curve 45) and the signal UC2_OK (curve 46) are at the high level, as well as the signal RESET1 (curve 41) and the signal RESET2 (curve 42).

Furthermore, the two units 31 and 32 re-initialise the watchdog system 24 periodically, in such a manner that the emergency system 25 is not activated. As a result, every second, the signal RST_SOS1 (curve 43) and the signal RST_SOS2 (curve 44) are inverted in such a way that the signal RST_SOS1 (curve 43) is set to high level when the signal RST_SOS2 (curve 44) is set to low level and conversely.

During operation in the normal situation, the units 31 and 32 equally provide the same instruction. Thus the signal ORDER1 (curve 47) and the signal ORDER2 (curve 48) are at the same level. Furthermore the control means 30 function as an AND gate to whose inputs are applied the signals ORDER1 and ORDER2 respectively. Furthermore the unit 31 indicates to the unit 32 that it is functioning in the normal situation, which allows the unit 32 to confirm this. Thus the signal EEP1 (curve 54) is inverted every second. In a similar manner, the unit 32 indicates to the unit 31 that it is functioning in the normal situation. Thus the signal EEP2 (curve 55) is inverted every second, so that the signal EEP1 (curve 54) is set to high level when the signal EEP2 (curve 55) is set to low level, and conversely.

Solely by way of example, consider that the access door is initially locked, i.e. the signal ORDER1 (curve 47) and the signal ORDER2 (curve 48) are at the low level. As a result, the control means 30 receive as input these two instructions as well as the signal CRS_END (curve 49) which emanates from the system for detecting a change in the position of the bolt 26. The control means 30 then provide as output to the mechanism 21 the order to maintain the current state of the lock, i.e. that the motor should not be started and that the bolt 22 will not change position. Thus the signal CRS_END (curve 49) is at the high level.

At an instant t1, the signal ORDER1 (curve 47) and the signal ORDER2 (curve 48) pass simultaneously to the high level so as to unlock the access door. As a result, the control means 30 receive this change of state of the instructions at its input and, after validation by the signal CRS_END (curve 49), provide as output to the mechanism 21 the order to change the current state of the lock, i.e. to start the motor to change the position of the bolt 22. Thus the signal CRS_END (curve 49) is set to the low level so that the cam of the motor leaves its end of run position. This cam then holds the signal CRS_END (curve 49) at the low level so that is continues its course. When the cam is at the end of the run, it sets the signal CRS_END (curve 49) to the high level, which stops the motor.

The access door is then unlocked. In other words, the bolt 22 has changed position, which is detected by the detection system 26 for change in the position of the bolt. Then, when the signal EEP1 (curve 54) is at the high level, at an instant t2, the unit 31 has write access to the EEPROM memory and writes a new event in the reserved shared zone of this memory, by way of the signal SDA (curve 57) and of the signal SCL (curve 58). By way of example, this event is the locking of the access door at an instant t6.

At an instant t3, the unit 31 informs the unit 32 that a new event is available in the EEPROM memory, which corresponds to the activity B described above with reference to Table 1. Thus, at the instant t3, the signal MDE0 (curve 51) is kept at the high level, and the signal MDE1 (curve 52) and the signal MDE2 (curve 53) are set to the low level.

At an instant t4, the signal EEP2 (curve 55) being at the high level, the unit 32 has access to read the shared zone of the EEPROM memory and reads the new event available in this zone, by means of the signal SDA (curve 57) and of the signal SCL (curve 58).

At an instant t5, the unit 31 informs the unit 32 that it is functioning in the normal situation, which corresponds to the activity H described above with reference to Table 1. Thus the signal MDE0 (curve 51) is kept at the high level and the signal MDE1 (curve 52) and the signal MDE2 (curve 53) are set to the high level. The situation is then like the initial situation and repeats itself, except that the signal ORDER1 (curve 47) and the signal ORDER2 (curve 48) which are at the high level, so as to maintain the current state of the lock, i.e. locking of the access door.

At the instant t6, the situation is like that at the instant t1 and recurs, except that the signal ORDER1 (curve 47) and the signal ORDER2 (curve 48) are set to the low level to change the state of the lock, i.e. to lock the access door.

Figure 6:
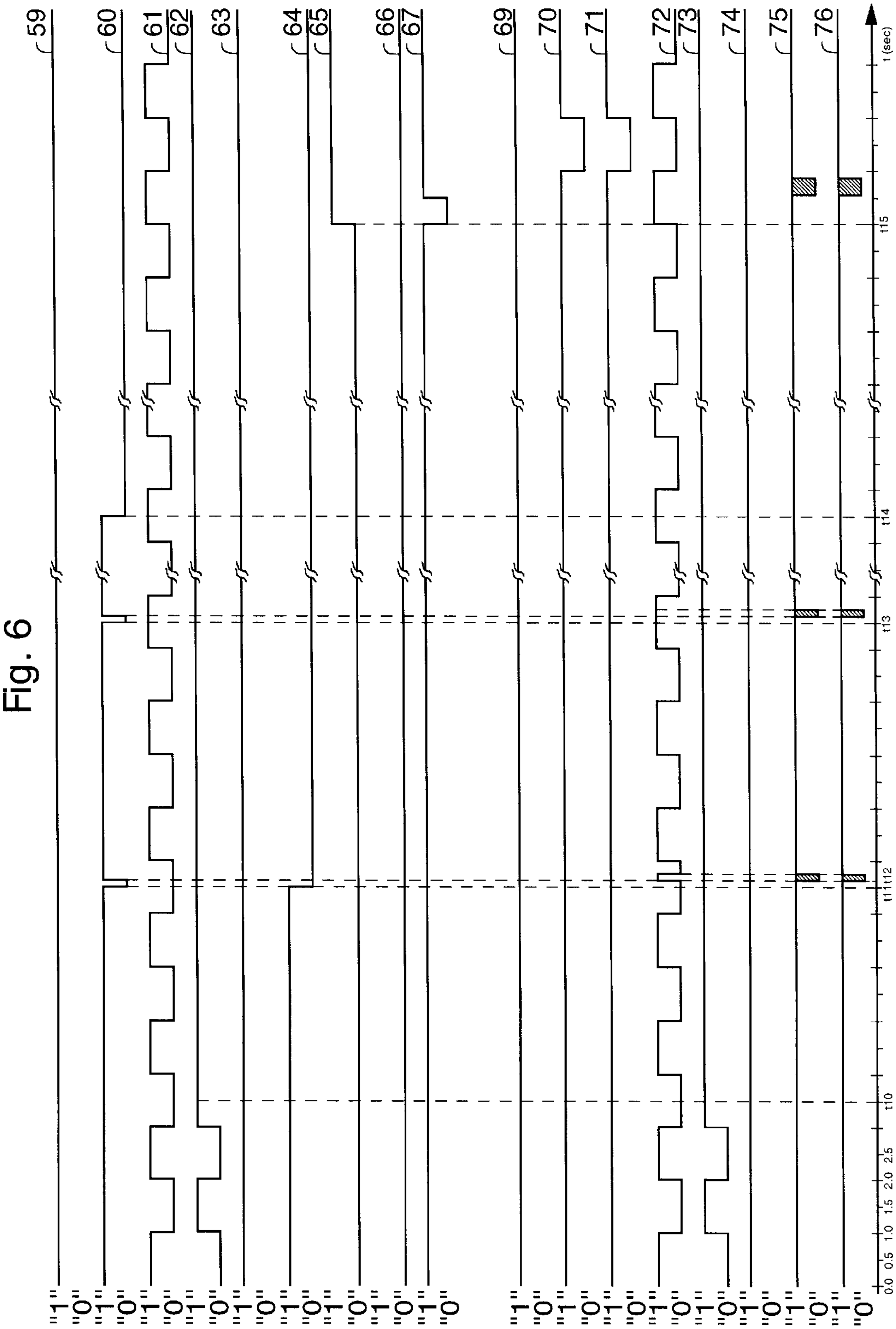
FIG. 6 shows waveforms of operation of the control device with redundancy according to the present invention, in the case of an exception situation.

Solely by way of example, FIG. 6 shows waveforms of operation of the control device according to the present invention in the case of an exception situation involving, in this case, an absence of activity of the unit 32.

Referring to the signals described with reference to FIG. 4, the references 59 to 67 and 69 to 76 of FIG. 6 denote the waveforms of the signals RESET1, RESET2, RST_SOS1, RST_SOS2, UC1_OK, UC2_OK, ORDER1, ORDER2, CRS_END, MDE0, MDE1, MDE2, EEP1, EEP2, WP, SDA, SCL respectively, these signals being capable of being set to a low level denoted "0" or a high level denoted "1".

As shown in FIG. 6, the initial situation is like the initial situation described with reference to FIG. 5.

At an instant t10, there is a disturbance which causes absence of activity of the unit 32. This results in the unit 32 no longer inverting the signal RST_SOS2 (curve 62) nor the signal EEP2 (curve 73) every second, the course of the other signals being unchanged in relation to the initial situation, prior to the instant t10.

At an instant t11, the unit 31 observes that the unit 32 is no longer inverting the signal EEP2 (curve 73) and attempts to re-initialise it by setting the signal RESET2 (curve 60) to the low level for 1 ms. At the instant t11, the unit 31 also sets the signal UC2_OK to the low level, so that the control means 30 no longer take account of the signal ORDER2 (curve 66). Then, at an instant t12, when the signal EEP1 (curve 72) is set to the high level, the unit 31 has write access to the EEPROM memory and writes its own time value in the protected shared zone of this memory, by way of the signal SDA (curve 75) and of the signal SCL (curve 76). Then, the signal EEP2 (curve 73) being at the high level, the unit 32 reads the value written in this reserved protected zone.

At an instant t13, the unit (curve 76) 31 observes that the unit 32 is still not active and attempts a renewed re-initialisation of the unit 32 by the signal RESET2 (curve 60). The situation is like that described at the instant t11 and repeats this.

At an instant t14, after several attempts at re-initialisation, the unit 31 decides to "disconnect" the unit 32 by keeping the signal RESET2 (curve 60) at the low level. In consequence, the control device 20 functions solely on the basis of the unit 31. Thus, at an instant t15, the access door is unlocked following the sole provision of the signal ORDER1 (curve 65), which is set to the high level, which effects the change of state of the lock at the instant previously programmed. In other words, the control system 23 has made use of its function of redundancy to manage a change of state of the lock in accordance with predetermined conditions and to ensure the state is maintained current up until the next change of state.

However, from the instant t15, the unit 31 no longer provides the instruction to re-lock the access door unless external technical intervention has taken place, which avoids making a destructive intervention on this door or on its lock.

It is obvious to the man skilled in the art that the detailed description above can undergo various modifications without departing from the scope of the present invention. For example, by way of one variant implementation, other types of unit can be provided in a control device with redundancy according to the present invention, this control device comprising control means for controlling a mechanism for locking and unlocking an access door to a protected place, these units having two different structures and two different modes of functioning, and being capable of providing like instructions to the said control means, and the said control means being so arranged that they behave functionally as an AND gate, to the inputs of which are applied the instructions from the units respectively, in the course of functioning in a normal situation of the said control device.

What is claimed is:

1. A control device with redundancy for fitting to a lock having a mechanism for locking and unlocking a door, the control device being adapted to manage at least one change of state of the lock under predetermined conditions and to ensure that this state is kept current up until the next change of state, the control device comprising:

a control system with redundancy comprising control means for controlling the mechanism and at least first and second electronic units for providing identical instructions to the control means, wherein the first electronic unit and the second electronic unit are connected in parallel to the control means; and a user interface between the control device and a user; wherein the first electronic unit has a first structure and a first mode of functioning and the second electronic unit has a second structure and a second mode of functioning, these two electronic units being so arranged that the first and second structures are different and that the first and second modes of functioning are different, while effecting common functions; and the control means behave functionally as an AND gate to the inputs of which are respectively applied the instructions from the first and second electronic units, when the control device is functioning in a normal situation.

2. A control device according to claim 1, wherein the common functions are the checking of the validity of access codes, checking the presence of activity of the other electronic unit, ensuring that the passage of time and the unlocking and locking of the door according to predetermined time conditions are maintained.

3. A control device according to claim 2, wherein each electronic unit further comprises means for providing check signals in order to provide the other electronic unit with check signals representing the current activity of the electronic unit, this electronic unit being adapted to implement a plurality of activities, and connecting means for connecting the electronic units together electrically, these means being so arranged that each electronic unit provides the check signals to the other electronic unit.

4. A control device according to claim 3, further comprising electrical resistances as protection means, these resistances being connected in series with the said connecting means.

5. A control device according to claim 2, further comprising a watchdog system formed by detecting means for detecting the presence of activity of the electronic units, and trigger means for triggering an emergency system when the two electronic units no longer function over a period greater than a predetermined time.

6. A control device according to claim 2, wherein the control system further comprises an intermediate unit connected electrically to the electronic units, for acting as an intermediary during a transfer of data between the electronic units and to maintain a log of events relating to the transactions effected on the lock, changes of state of the lock and detection of disturbances and anomalous situations.

7. A control device) according to claim 6, characterized in that the intermediate unit is formed by memory means with at least dual access, in which each electronic unit stores data for later provision to the other electronic unit, so as to implement the function of an intermediary.

8. A control device according to claim 7, wherein the memory means are formed by a non-volatile memory.

9. A control device according to claim 7, wherein the memory means are formed by an EEPROM memory.

10. A control device according to claim 9, wherein the EEPROM memory comprises:

a shared zone for storing data provided by one of the electronic units and destined to be fed later to the other electronic unit; and a protected reserved zone whose write access is reserved to the first electronic unit, this zone being for storing parameters programmed by the user and operating variables.

11. A control device according to claim 10, wherein the programmed parameters comprise access codes and identity variables of the lock, and time data relating to unlocking and optionally to locking the door.

12. A control device according to claim 10, wherein the operating variables are the nominal voltage thresholds, the absolute error value of the frequency of oscillation of the quartz crystal, and parameters relating to the quality standards.

13. A control device according to claim 10, wherein the EEPROM is further so arranged that the two electronic units access the shared zone alternately, so as to protect the coherence of the data exchanged with the EEPROM memory, especially in the case in which one of the electronic units is the seat of a disturbance or an anomalous situation.

14. A control device according to claim 2, wherein the first electronic unit comprises:

measuring means for measuring the level of the electric power supply;

means for providing alarm control signals when a disturbance or an anomalous situation is detected; and means for controlling a display on display means.

15. A control device according to claim 1, further comprising means for providing alarm signals being arranged to provide alarm signals when the means for providing alarm signals receive the alarm control signals from the first electronic unit.

16. A control device according to claim 1, further comprising a detection system so arranged as to provide detection signals when a change of state of the bolt of the lock has taken place.

17. A control device according to claim 16, wherein the detection system is formed by a mechanical circuit breaker.

* * * * *